(12) United States Patent
D'Alessio et al.

(10) Patent No.: US 9,599,786 B2
(45) Date of Patent: Mar. 21, 2017

(54) LOW WAVEFRONT DISTORTION OPTICAL MOUNT

(71) Applicant: Thorlabs, Inc., Newton, NJ (US)

(72) Inventors: Brett D'Alessio, Califon, NJ (US); Alex Ezra Cable, Newton, NJ (US)

(73) Assignee: Thorlabs, Inc., Newton, NJ (US)

( * ) Notice: Subject to any disclaimer, the term of this patent is extended or adjusted under 35 U.S.C. 154(b) by 135 days.

(21) Appl. No.: 14/141,148

(22) Filed: Dec. 26, 2013

(65) Prior Publication Data

US 2014/0175242 A1    Jun. 26, 2014

Related U.S. Application Data

(60) Provisional application No. 61/745,932, filed on Dec. 26, 2012.

(51) Int. Cl.
| | | |
|---|---|---|
| *A47G 1/17* | (2006.01) | |
| *G02B 7/00* | (2006.01) | |
| *G02B 7/02* | (2006.01) | |
| *G02B 7/182* | (2006.01) | |

(52) U.S. Cl.
CPC ............. *G02B 7/004* (2013.01); *G02B 7/026* (2013.01); *G02B 7/1825* (2013.01)

(58) Field of Classification Search
CPC ............................... G02B 7/004; G02B 7/1825
See application file for complete search history.

(56) References Cited

U.S. PATENT DOCUMENTS

| | | | | |
|---|---|---|---|---|
| 3,642,353 A * | 2/1972 | Field | ................... | G02B 7/1825 248/481 |
| 3,942,337 A * | 3/1976 | Leonard | ................ | B25B 23/141 464/36 |
| 5,052,782 A * | 10/1991 | Myer | ..................... | G02B 7/026 359/694 |
| 5,177,641 A * | 1/1993 | Kobayashi | ............. | G02B 7/026 359/819 |
| 5,331,461 A * | 7/1994 | Hwang | ..................... | B60R 1/06 359/507 |
| 6,043,863 A | 3/2000 | Ikeda | | |
| 7,797,797 B2 * | 9/2010 | Chiang | ................... | G06F 1/162 16/367 |

(Continued)

FOREIGN PATENT DOCUMENTS

| | | |
|---|---|---|
| JP | 2012247568 A | 12/2012 |
| SU | 995054 A1 | 2/1983 |
| WO | 2011053929 A1 | 5/2011 |

OTHER PUBLICATIONS

Spravochnik konstruktora optiko-mekhanicheskikh priborov, pod red. d-ra tekhn. nauk V.A. Panova. Leningrad, "Mashinostroenie," Leningradskoe etdelenie, 1980, p. 271-274, 281.

(Continued)

*Primary Examiner* — Amy Sterling
(74) *Attorney, Agent, or Firm* — Graham Curtin, P.A.

(57) ABSTRACT

An optical mount is disclosed having at least one restraining element for an optic having at least one contact point with a first surface of the optic and at least one force element having at least one contact point with a second surface of the optic, wherein each contact point on the first surface of the optic has a corresponding contact point on the second surface of the optic.

16 Claims, 8 Drawing Sheets

(56) References Cited

U.S. PATENT DOCUMENTS

| | | | |
|---|---|---|---|
| 8,721,200 B1* | 5/2014 | Cheng | G03B 17/565 |
| | | | 396/448 |
| 8,892,034 B2* | 11/2014 | McGuire | G01D 21/00 |
| | | | 361/728 |
| 2003/0189769 A1* | 10/2003 | Anderson | G02B 6/2931 |
| | | | 359/819 |
| 2006/0132934 A1 | 6/2006 | Hille | |
| 2008/0225255 A1 | 9/2008 | Margeson et al. | |
| 2009/0002847 A1* | 1/2009 | Nakada | G02B 7/102 |
| | | | 359/702 |
| 2011/0249342 A1 | 10/2011 | Scaggs | |
| 2013/0235263 A1* | 9/2013 | Ryu | H01L 27/14618 |
| | | | 348/374 |

OTHER PUBLICATIONS

International Search Report and Written Opinion mailed Apr. 24, 2014 in corresponding International Application No. PCT/US2013/077848.

Supplementary Partial European Search Report issued for corresponding European Patent Application No. EP13867333.0 dated Jul. 21, 2016.

Extended European search report including the European search opinion issued for corresponding European Patent Application No. 13867333.0 dated Dec. 6, 2016.

Chinese Notice of First Office Action, dated Dec. 27, 2016, for corresponding China application No. 201380067899.2.

* cited by examiner

RETAINING RING WITH OPTIC REFERENCE ADJUSTMENT STOP

LOW WAVEFRONT DISTORTION OPTICAL MOUNT

CROSS-REFERENCE TO RELATED APPLICATIONS

This application claims the benefit of U.S. Provisional Application No. 61/745,932, filed Dec. 26, 2012, the contents of which are incorporated by reference herein.

FIELD OF THE INVENTION

The present invention relates to optical mounts generally, and more specifically to optical mounts configured to reduce distortion in an optic when in use.

BACKGROUND

An optical mount is an optomechanical device that supports an optical element so as to ensure that the specifications of the optical element are not unintentionally compromised. As researchers and product developers push the boundaries of the optical sciences, there has been an increasing need for optomechanical assemblies that more fully preserve the specifications of the high performance optical elements they support. Many modern optical mounts significantly compromise the specifications of the mounted optics.

Laser quality optical elements are typically finished to very high tolerances. For example, a laser quality mirror would typically be polished flat to within 0.063 μm to 0.032 μm, or about 1/10 to 1/20 of the wavelength of red light emitted from a HeNe laser. Currently available optical mounts have been found to exert forces on the precision optics that substantially degrade their optical performance, thereby degrading the performance of the optical system in which they are being used. For example, the flatness of a laser mirror is degraded by securing it with a nylon tipped set screw driven into the optic's edge. Another example being the optical retardation of a half wave plate used to control the polarization of a light field has its polarization properties compromised when mounted in a traditional mount.

Many existing devices contain, for example, individual spring-loaded fingers to clamp the optic, each requiring individual adjustment and creating unbalanced forces of different magnitude and direction. The designs have many parts and are difficult to adjust without creating unexpected forces and stresses. Existing devices often are not adaptable for different sized optics, because, for example, spring forces are not easily adjustable.

In addition to maintaining the specifications of the mounted optics, there are advantages to maintaining access to as much of the front surface and perimeter of an optic as possible.

SUMMARY

In one embodiment, there is provided an optical mount that ensures that an optic is held in place with a very low level of optical distortion and exceptional stability. The low distortion mounting mechanism provides a quantified and adjustable set of forces that, as an additional benefit, can be made to be relatively constant over a range of environmental conditions. The location of the mounting forces are controlled so as to minimize the distorting force on the optic while providing sufficient clamping force to meet the needs of high performance optical systems.

The design described can be applied to a broad range of optical devices that reflect, transmit, or process light fields.

DETAILED DESCRIPTION OF THE PREFERRED EMBODIMENTS

Figure 1:
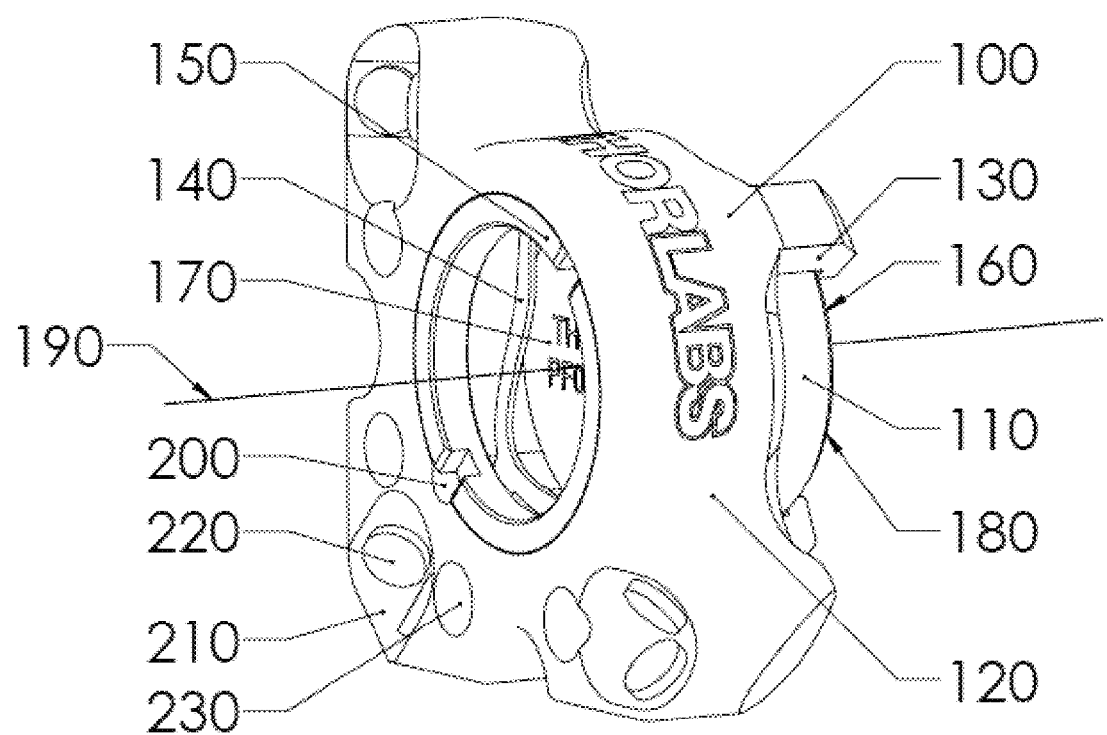
FIG. 1 shows a perspective view of one embodiment of an optical mount in accordance with the current disclosure.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

This disclosure describes the best mode or modes of practicing the invention as presently contemplated. This description is not intended to be understood in a limiting sense, but provides an example of the invention presented solely for illustrative purposes by reference to the accompanying drawings to advise one of ordinary skill in the art of the advantages and construction of the invention. In the various views of the drawings, like reference characters designate like or similar parts.

It is important to note that the embodiments disclosed are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality.

FIG. 1 shows an optical mount front plate 100 in accordance with the current disclosure. Optical mount front plate 100 contains components for accurately locating and maintaining at least one optic 110 within a housing 120 while minimizing and controlling forces on optic 110 and maintaining access to the majority of a first surface 160 and perimeter 180 of optic 110. While optic 110 is illustrated as a disk in the described embodiments, it will be appreciated that other geometric shapes or configurations may be used. Generally, optic 110 is stabilized in optical mount 100 between at least one restraining element 130 and at least one force application element 140. The optic is held between restraining element 130 having at least one contact point with the first surface 160 of optic 110 and force application element 140 having at least one contact point with a second surface 170 of optic 110 corresponding to the contact point of restraining element 130 with the first surface 160, with the two elements combining to exert a clamping force on a small portion of optic 110. Force application element 140 is in turn held in place by retaining element 150, which may be used to adjust the force applied by force application element 140 to optic 110.

In the embodiment shown, optic 110 is a disk with a first surface 160, a second surface 170 opposite the first surface 160, and a perimeter 180 having a thickness and a central axis 190 perpendicular to the first surface of the disk. Pressure between restraining element 130 and force application element 140 accurately locates and maintains optic 110 in one dimension along central axis 190.

Restraining element 130 and force application element 140 contact optic 110 at discrete locations on the surfaces 160, 170 of optic 110. Preferably, the elements contact optic 110 at the periphery of the surfaces 160, 170 of the optic 110 adjacent to perimeter 180. Restraining element 130 contacts discrete locations on the first surface 160 of optic 110 and force application element 140 contacts discrete locations on the second surface 170 of optic 110 wherein the discrete locations on the first 160 and second 170 surfaces are opposite each other and adjacent to perimeter 180 at substantially the same radial location. Restraining element 130 and force application element 140 thereby combine to form a clamp maintaining the location of optic 110 along axis 190.

In order to ensure that they maintain discrete contact locations directly opposite each other on the surfaces 160, 170 of optic 110, restraining element 130 and force application element 140 are located relative to housing 120. In the illustrated embodiment, restraining element 130 is an extension of housing 120, and the location relative to housing 120 is therefore known. Force application element 140 is keyed to a notch 200 in housing 120 in order to consistently locate it relative to restraining element 130 for applying a clamping force.

Optic 110 may further be accurately located in a lateral plane of the first surface 160 by providing a home position with an element (not shown) that provides the necessary force to secure optic 110 in the lateral plane. In some applications, this force is adjustable over a range, and calibrated so as to provide a known impact on the optical distortion of a device in which the optic is used. In some embodiments, tolerances in the lateral plane of optic 110 are less critical than along axis 190. In such embodiments, optic 110 may be restrained by traditional means along the lateral plane. A nylon tipped set screw may be used as a force element and a double bored mounting feature can be used as a well-defined restraint.

In the embodiment shown, restraining element 130 is a set of three tabs 132 (FIG. 2), or fingers extending from housing 120 and cradling optic 110. In the embodiment shown, restraining element 130 extends from housing 120 along axis 190 before turning in order to form a cradle for optic 110. Such an extension allows access to most of first surface 160 and perimeter 180 of optic 110. Since perimeter 180 is largely exposed, restraining element 130 may be further configured to allow a laser beam to pass close to the edge of optic 110 in the spaces between the tabs or fingers 132. Restraining element 130 may further include elements for locating optic 110 in the plane of the first surface 160. One non-limiting example of such an element (not shown) may include a lateral force generating element in at least one of the restraining elements 130 which applies lateral force in order to have optic 110 rest on kinematic contact points maintained in the remaining restraining elements 130. In such an embodiment, the force that drives optic 110 into the kinematic restraint is adjustable within an appropriate range, or through the application of a fixed calculated force. Restraining element 130 may also include a set of discrete landing points incorporated into the body 120 of optical mount 100. Such landing points may be, for example, raised relative to a circumferential lip of housing 120. In alternative embodiments, restraining element 130 may be any other type of restraint that maintains contact with optic 110 at discrete locations on the first surface 160 of optic 110. For example, this may be achieved with individual precision ground ball bearings that act to provide nearly perfect point contact between element 130 and the optic 110.

In the illustrated embodiment, force application element 140 is a wave spring with three points in contact with optic 110. A wave spring used may have a range of shapes, sizes, displacements, and spring constants, as long as the number of contact points between the wave spring and optic 110 matches the number of contact points between restraining element 130 and optic 110, and each contact point corresponds to a restraining element. The notch 200 may control the rotational orientation of the spring about axis 190.

In alternative embodiments, force application element 140 may be, for example, a series of compression springs, extension springs, spring clips, permanent magnets, electromagnets, or other mechanisms used to apply force. Force application element 140 may be any device for applying force to optic 110 at discrete locations on the surface of the optic 110. In some embodiments, for example, force application element 140 may be a pusher ring and compression spring assembly. In such an assembly, a pusher ring may have three contact points for contacting the second surface 170 of optic 110 at discrete locations. While three contact points are illustrated, it will be appreciated that other numbers of contact points are possible. Additionally, it is anticipated that for some special applications, the location and number of the contact points may not be, and/or may not directly correspond. This may be desirable if, for example, the application requires a specific set of forces to be applied to the optic so as to alter its relaxed shape.

Optical mount front plate 100 further contains features for easing integration into existing applications. Optical mount front plate 100 comprises, for example, an indentation 210 (FIG. 1) including pads 220 for locating the optical mount front plate 100 relative to an optical mount back plate 300. Optical mount front plate 100 further comprises four spring holes 230 for affixing the optical mount front plate 100 to the optical mount back plate 300.

Figure 2:
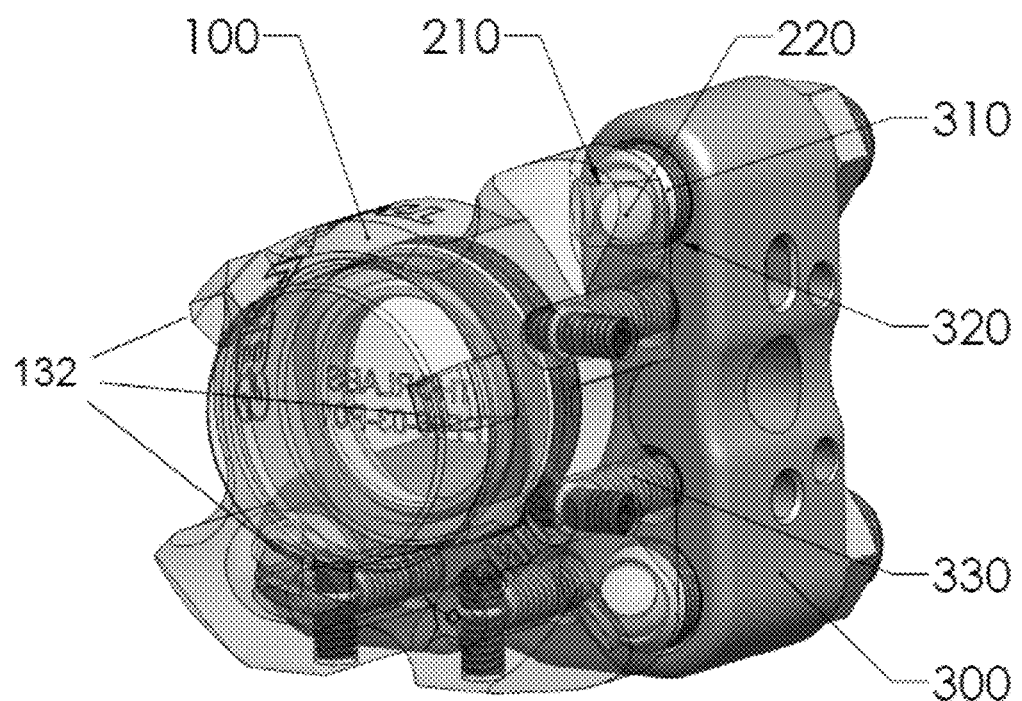
FIG. 2 shows a perspective view of the optical mount of FIG. 1 installed on a bracket with the optical mount shown semi-transparent.

FIG. 2 shows one embodiment of a perspective view of the optical mount front plate 100 of FIG. 1 installed on an optical mount back plate 300 with the optical mount front plate 100 shown semi-transparent. The optical mount back plate 300 contains fine adjustment screws 310 for mating with indentations 210 and pads 220 on optical mount front plate 100. Mounting screw holes 320 are provided to fix the optical mount front plate 100 within a larger optical setup. Fine adjustment screws 310 may be adjustable within bracket 300 in order to control the distance between optical mount front plate 100 and optic mount back plate 300 at three locations. Optic mount back plate 300 can in turn be attached to a larger structure for use in various optical and optomechanical applications. The front plate 100 is kinematically restrained to sit on the three fine adjustment screws 310 by the force provided by four springs 330.

Figure 3:
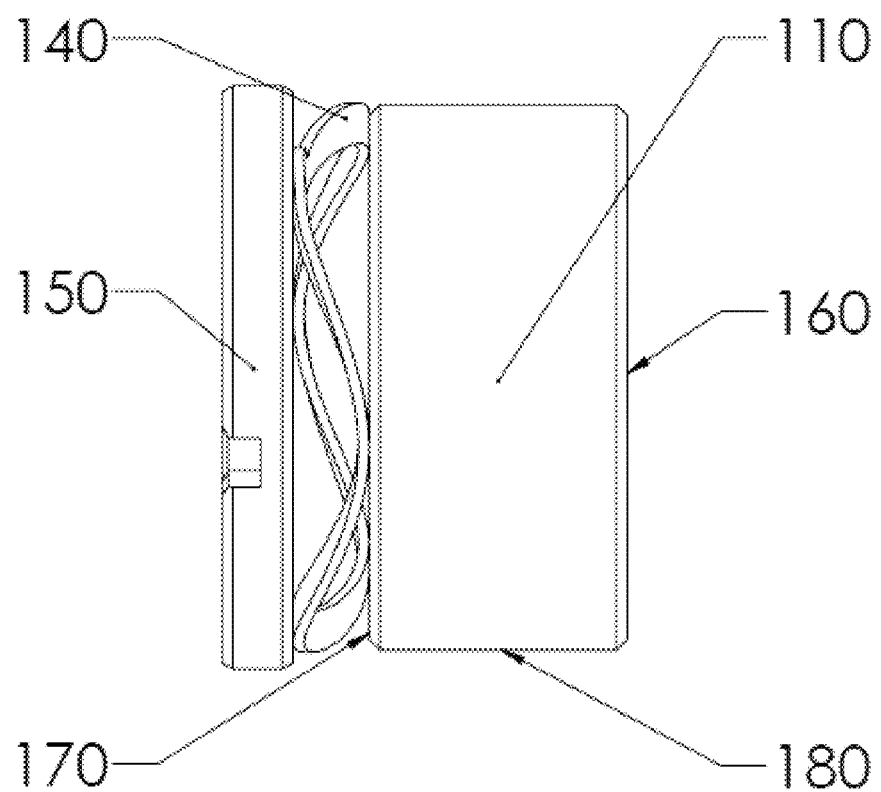
FIG. 3 shows a side view of internal elements of the optical mount of FIG. 1.
Figure 4:
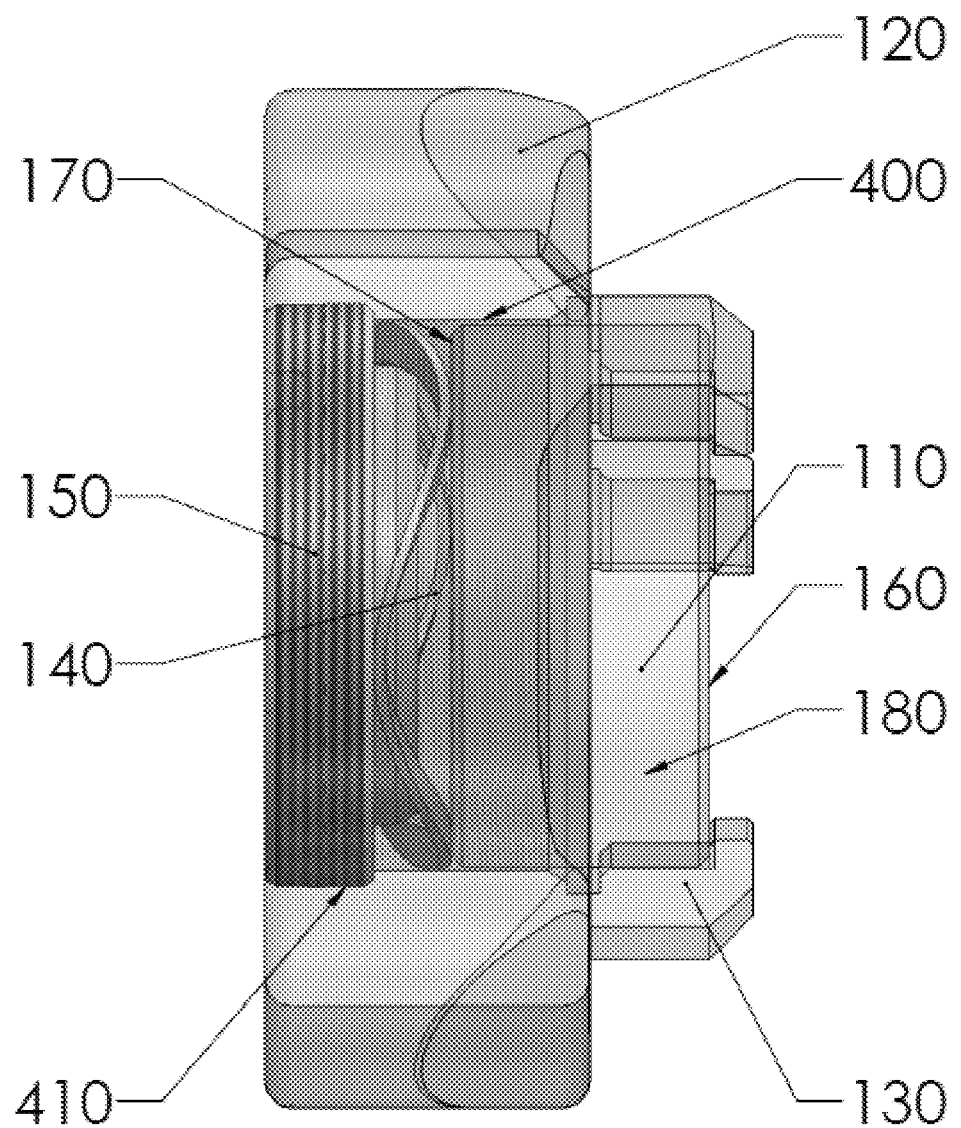
FIG. 4 shows a side view of internal elements of the optical mount of FIG. 1 shown in FIG. 3 installed in a housing that is shown in semi-transparent.

FIGS. 3-4 show a side view of one embodiment of internal elements of the optical mount front plate 100 of FIG. 1, where FIG. 3 shows the internal elements alone, and FIG. 4 shows the internal elements installed in a housing 120 shown in semi-transparent for purposes of illustration. Shown in FIGS. 3-4 are optic 110, force application element 140, and retaining element 150. Force application element 140 applies force to the second surface 170 of optic 110, and lies between optic 110 and retaining element 150. In the illustrated embodiment, the internal elements are placed in a cylindrical bore 400 in housing 120.

When installing optic 110 in optical mount front plate 100, a user first inserts optic 110 into bore 400 of housing 120 so that the first surface 160 of optic 110 rests on restraining element 130 which extends from the end of bore 400. When optic 110 rests on restraining element 130, substantial portions of perimeter 180 of optic 110 are exposed, in addition to almost the entire first surface 160.

The user then inserts force application element 140 so that it rests on second surface 170 of optic 110. In the embodiment shown, force application element 140 is a wave spring keyed so that it contacts second surface 170 of the optic 110 along the circumference of optic 110 adjacent to the same point along perimeter 180 of optic 110 as restraining element 130 contacts first surface 160.

Following the insertion of force application element 140, retaining element 150 is inserted and adjusted to complete the assembly. The amount of force applied to optic 110 by force application element 140 is governed by retaining element 150. Bore 400 may have threading 410 and retaining element 150 may be a threaded retaining ring fitted to bore 400.

Figure 5:
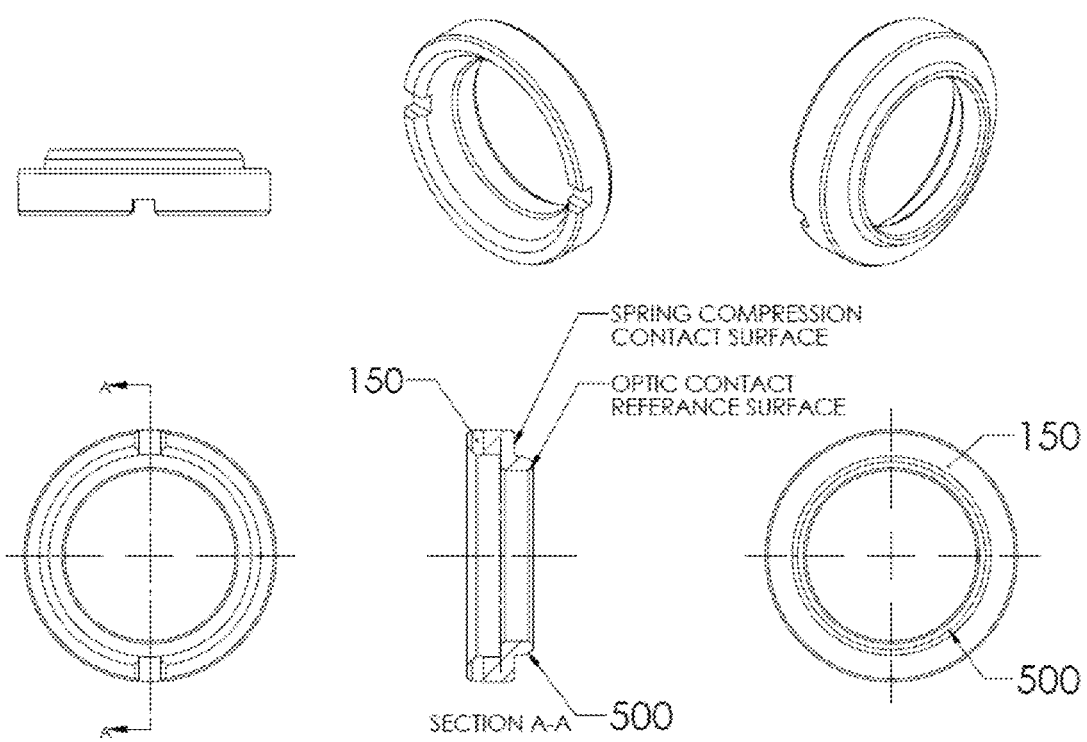
FIG. 5 shows one embodiment of a retaining element for use in the optical mount of FIG. 1.
Figure 6:
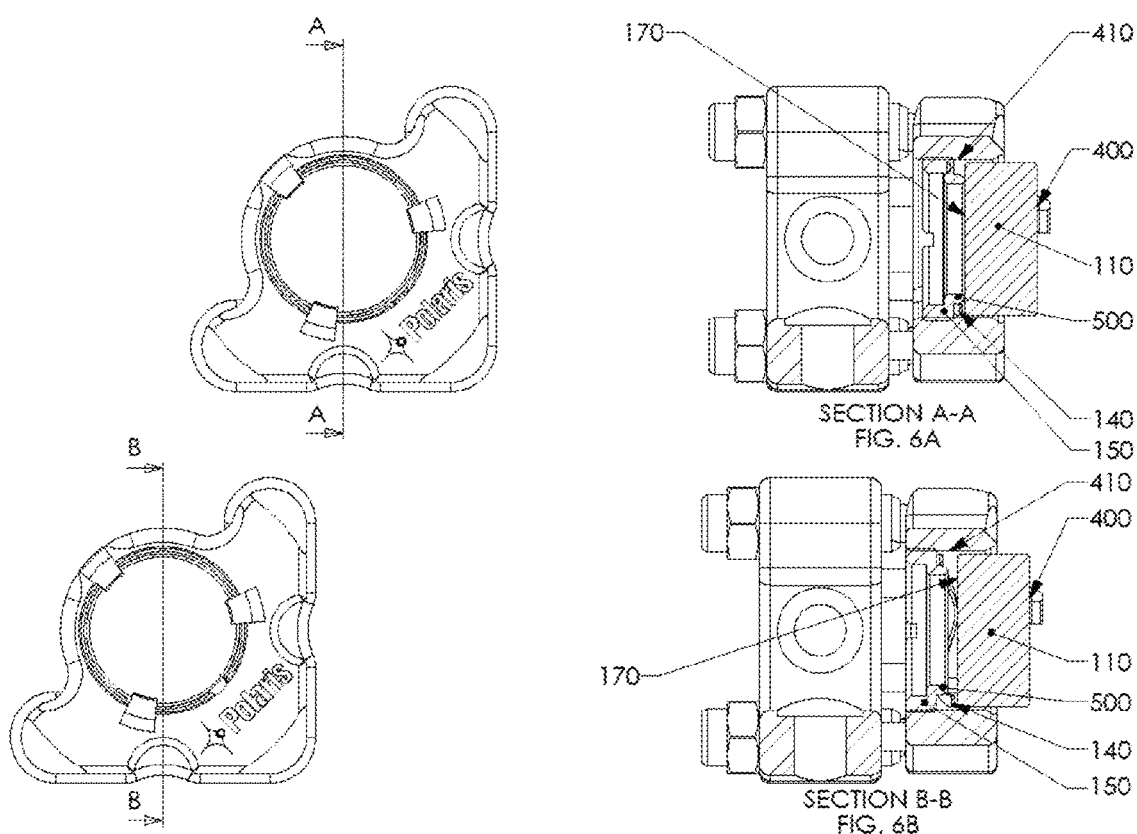
FIGS. 6A and 6B show the use of the embodiment of the retaining element of FIG. 5 in calibrating the optical mount of FIG. 1.

FIG. 5 shows a retaining element 150 for use in the optical mount front plate 100 of FIG. 1, and FIG. 6 show the use of the retaining element 150 of FIG. 5 in calibrating the optical mount front plate 100 of FIG. 1. During installation of optic 110, a threaded retaining element 150 which includes a boss 500 may be inserted and rotated on threading 410 until boss 500 touches optic 110. Boss 500 may extend beyond force application element 140 by, for example, extending through the center of a wave spring. When contact is made between optic 110 and boss 500 as shown in FIG. 6A, force application element 140 is in a known state. In some embodiments, a specialized retaining element 150 is used wherein the retaining element 150 has a compression stop feature that touches the second surface 170 of the optic 110 to lock retaining element 150 at a specified compression. A user may then rotate retaining element 150 in the opposite direction of the initial insertion by a designated amount using, for example, a spanner wrench. In some embodiments, repeatability may be enhanced by marking a spanner wrench with angular markings that work in concert with markings on optical mount front plate 100 so that the user can rotate retaining element 150 by a known amount in order to reduce the force applied by a known amount. Retaining element 150 may be tuned so that the appropriate rotation is, for example, one full rotation. In loosening retaining element 150 by a known amount, a suitable amount of space may be left between boss 500 and second surface 170, allowing force application element 140 to flex an appropriate amount, as shown in FIG. 6B.

In an alternative embodiment, the retaining element may be a stepped retaining ring (not shown) with a flat contact area to fully compress force application element 140 against optic 110. A series of graduations in ½ degree to 2 degree increments could be made available on optical mount front plate 100 or a spanner wrench that mates with such retaining element. The graduated scale could be fixed or rotatable so that it can be used to define a clear starting point. After compressing force application element 140, such retaining element is backed away from full compression. The graduated scale could then be used in conjunction with, for example, a vernier scale to provide fractions of a degree resolution for the setting of such retaining element.

If a user is installing a retaining element without a boss, the retaining element may be tightened to a desired preload using a torque force meter. Retaining element 150 and optical mount 110 could be supplied with very fine threads to further enhance the setting of the magnitude of the compressive force that holds the optic.

Optical mounts are generally designed to hold a specific range of optical elements, in terms of size. For example, an optical mount may be designed to support a 25.4 mm diameter mirror that is anywhere from 4 mm to 10 mm thick. In some embodiments, a set of accessory parts are therefore provided for optical mount front plate 100 for fitting various optics. The parts can be replaced so as to achieve the prescribed level of performance desired for a given optic. A combination of such accessory parts is useful over a specified range of optics 110 and may provide, for example, a customized fit for an optic 110 that would otherwise not fit in optical mount front plate 100. Such accessory parts are inexpensive relative to optical mount front plate 100 and can be replaced in order to configure optical mount front plate 100 for a specified optic 110 or range of optics. Optical mount front plate 100 may be available in a specified set of sizes, and accessory parts could be used to modify optical mount front plate 100 for use with optics between the sizes in the set. Accessory parts could be configured through, for example, modifying the magnitude of the force applied by force application element 140, so as to provide the best possible performance for the type, shape, and thickness of the optic 110 used.

Accessory parts may modify other characteristics of optical mount front plate 100. For example, accessory parts may be exchanged in order to produce varying outcomes, such as trading immunity from environmental vibrational forces for lower wavefront distortion. As such, a plot of wavefront distortion as a function of the applied force may guide the choice of accessory parts for a given optical element.

Additionally, retaining element 150 would allow for some tuning. Data required for such tuning may be made available through, for example, a plot or lookup data table. Such tuning may be critical when mounting, for example, thin, distortion sensitive polarization optics, or thicker optics that are finished to exacting tolerances that must not be compromised through distortions for the mounting. Such tuning may also be critical where some distortion can be tolerated in exchange for higher clamping forces to ensure the long term stability of the optic. In some embodiments, retaining element 150 is used for tuning. In other embodiments, tuning can be manual, electrical, pneumatic, or dynamic in order to respond to time varying needs of an application.

Embodiments of the disclosed optical mount provide reliable performance across a range of temperatures, making it ideal for long lifetime instruments deployed in harsh environments. In embodiments using a wave spring as force application element 140, forces on optic 110 are relatively unchanged over temperature changes, as the spring can absorb strain generated by thermal expansions. Beam pointing stability and low optical distortion make it ideal for use in sealed instruments with long intervals between service. Acceptable levels of distortion are maintained over extended periods of time. Optical mount front plate 100 further provides for a field selectable trade-off between optical distortion and the magnitude of the restraining forces used to secure the optic. Optical mount front plate 100 further provides for allowing a beam to pass close to an optic's 110 edge, with face mount clamping and a full ring style optic frame.

Figure 7:
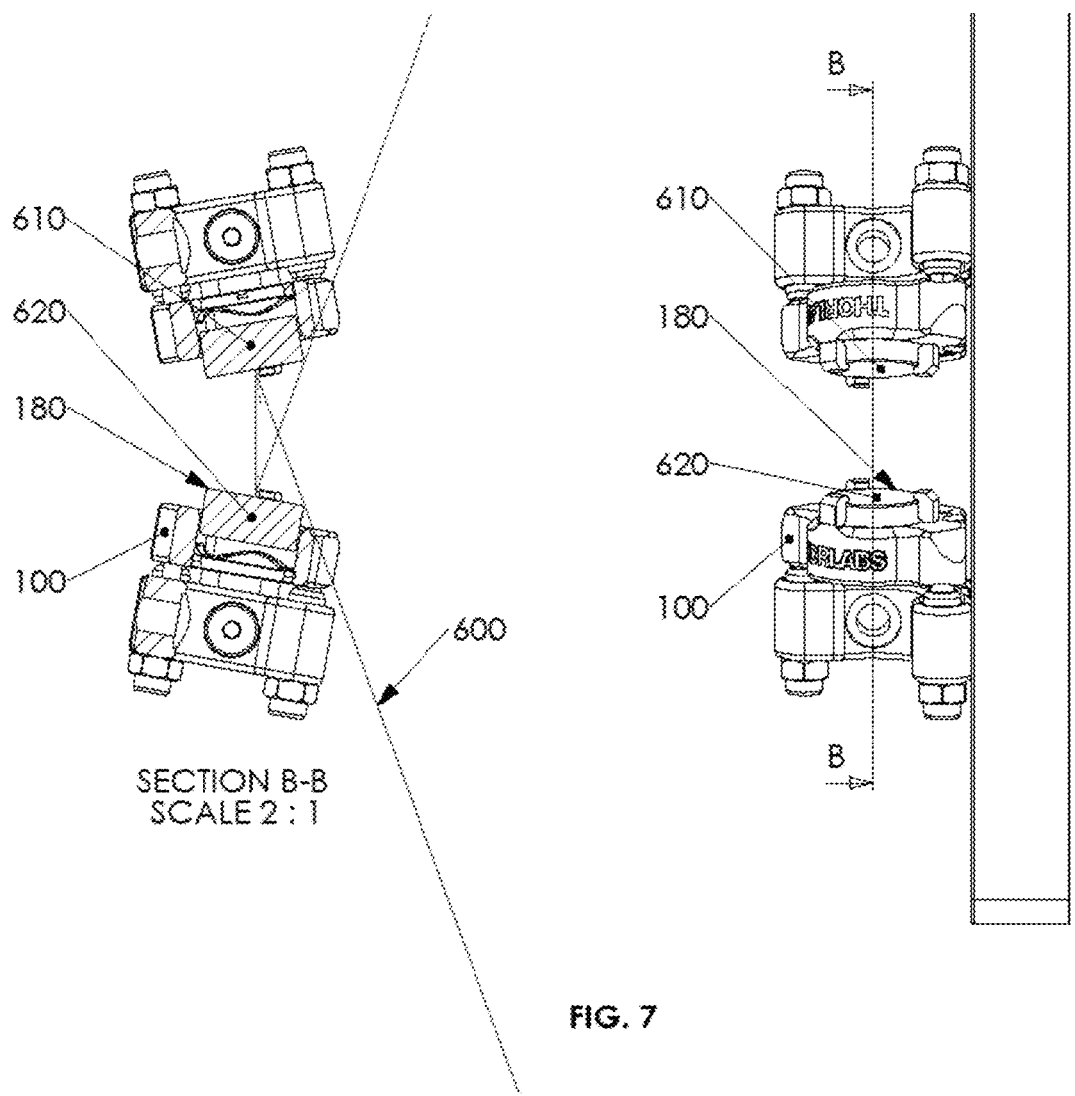
FIG. 7 is one embodiment of an optic setup using certain special features of the optical mount of FIG. 1.

FIG. 7 shows one embodiment of an optic setup using features of the optical mount 100 of FIG. 1. Two optical mount front plates 100 having optics 610, 620 that are configured so that a beam 600 reflects off both optics and continues in a controlled direction. Optical mount front plate 100 allows the beam 600 to pass close to perimeter 180 of a first optic 610 after reflecting off a second optic 620. Restraining element 130 is configured to allow beam 600 to pass close to perimeter 180.

The optical mount front plate 100 can be applied to a broad range of optical devices that reflect, transmit, or process light fields. It can be used to mount, for example, a plano mirror, a muti-order wave plate, or a plano-convex lens. The range of optical devices to which optical mount front plate 100 can be applied is expanded by the design features described above. Because optical mount front plate 100 requires only discrete clamping points around the perimeter of optic 110, designs can provide enhanced access to the edges of the optic, allowing, for example, for excess material around optic 110 to be removed. Since the discrete clamping points are minimal, designs may allow for optics 110 mounted in close proximity to each other. Designs may also be implemented in optical devices, such as mirror mounts, containing pitch and yaw movement, a fixed optic holder, and a rotational mount used to fix the location in all degrees of freedom but allow for a rotational axis of an optic. Additionally, optical mount front plate 100 is symmetrical in a preferred embodiment, allowing the mount to be flipped 90 degrees to operate in both left and right orientations while providing the same functionality.

Figure 8A:
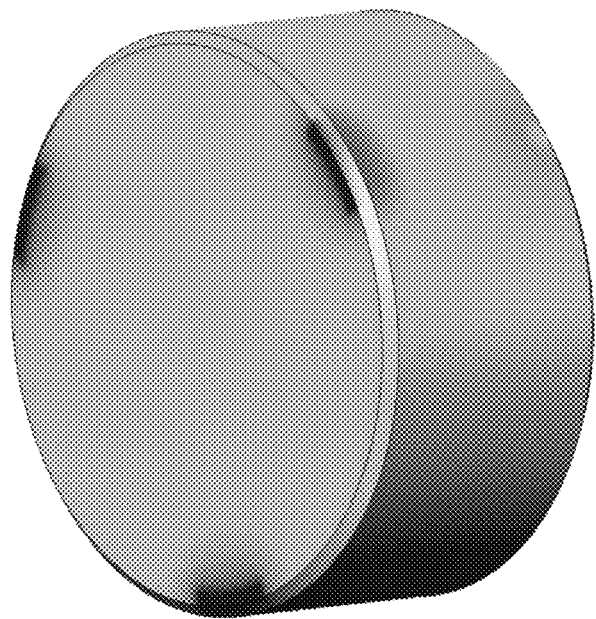
FIGS. 8A and 8B show one embodiment of a finite element analysis illustrating pressures on an optic mounted in the optical mount of FIG. 1 compared to a finite element analysis applied to an optic mounted in a traditional side mount.
Figure 8B:
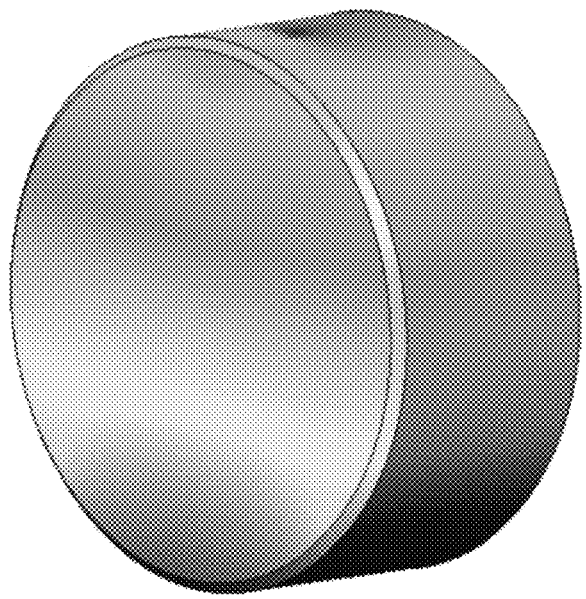

FIGS. 8A and 8B shows one embodiment of a finite element analysis (FEA) illustrating pressures on an optic 110 mounted in the optical mount front plate 100 of FIG. 1 and compares the pressures to those on an optic 110 mounted in a typical side mount of the prior art. The finite element analysis of FIG. 8A shows optical distortion and strain on the front of optic 110 when mounted in optical mount front plate 100. However, very little optical distortion appears on optic 110, and the strain that does exist appears only at the perimeter 180 of optic 110, and primarily at the three contact points where restraining element 130 and force application element 140 contact optic 110.

FIG. 8B shows an FEA applied to an optic 110 mounted in a traditional side mount, which leads to pressure gradients across the surface of the optic 110.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. An optical mount comprising:
   at least one restraining element for an optic having at least one discrete contact point adjacent to a perimeter of the optic and configured to contact with a first surface of the optic; and
   at least one force element having at least one discrete contact point adjacent to a perimeter of the optic and configured to contact with a second surface of the optic, the second surface being opposite to the first surface,
   wherein each discrete contact point to contact with the first surface of the optic has a corresponding discrete contact point to contact with the second surface of the optic at substantially the same radial location.

2. The optical mount of claim 1, wherein the at least one force element is a wave spring.

3. The optical mount of claim 2, wherein the wave spring contacts the second surface of the optic in a plurality of locations and wherein each contact point corresponds to a restraining element.

4. The optical mount of claim 3, further comprising:
   a housing containing the at least one restraining element and the wave spring; and
   at least one spring receiving notch;
   wherein the spring receiving notch controls the rotational orientation of the spring about an axis perpendicular to the first surface.

5. The optical mount of claim 1, wherein the at least one force element is a plurality of compression springs maintained within a housing.

6. The optical mount of claim 1, wherein the at least one force element is a plurality of magnets maintained within a housing.

7. The optical mount of claim 1, wherein the at least one restraining element is at least one tab extending from a housing.

8. The optical mount of claim 7, wherein the at least one restraining element is three tabs extending from a housing.

9. The optical mount of claim 8, wherein a first tab has a pushing element having at least one contact point on a peripheral surface of the optic to secure the optic against the second and third tab.

10. The optical mount of claim 1, wherein the at least one restraining element extends from a housing along an axis perpendicular to the first surface and forms a cradle for the optic.

11. The optical mount of claim 10, wherein a majority of a perimeter of the optic is exposed.

12. The optical mount of claim 1, wherein the at least one restraining element is a pad mounted on a housing.

13. The optical mount of claim 1, wherein the force element is compressed against the optic by a retaining ring.

14. The optical mount of claim 13, wherein the retaining ring further comprises a boss.

15. The optical mount of claim 13, wherein a force applied by the force element on the optic is adjusted with the retaining ring.

16. The optical mount of claim 15, wherein the force element is in a bore in a housing wherein the bore is threaded so that the force from the retaining ring can be adjusted by rotating the retaining ring.

\* \* \* \* \*